United States Patent
Dewan et al.

(10) Patent No.: US 11,716,353 B2
(45) Date of Patent: *Aug. 1, 2023

(54) ESTABLISHMENT OF NETWORK CONNECTIONS

(71) Applicant: MaxLinear, Inc., Carlsbad, CA (US)

(72) Inventors: Prashant Dewan, Portland, OR (US); Divyashree-Shivakumar Sreepathihalli, Santa Clara, CA (US); Uttam K. Sengupta, Portland, OR (US)

(73) Assignee: MaxLinear, Inc., Carlsbad, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/399,038

(22) Filed: Aug. 10, 2021

(65) Prior Publication Data

US 2021/0377311 A1 Dec. 2, 2021

Related U.S. Application Data

(63) Continuation of application No. 16/464,444, filed as application No. PCT/US2016/069140 on Dec. 29, 2016, now Pat. No. 11,089,060.

(51) Int. Cl.
| | |
|---|---|
| *G06F 21/00* | (2013.01) |
| *H04L 9/40* | (2022.01) |
| *H04W 76/10* | (2018.01) |
| *H04L 12/46* | (2006.01) |
| *H04W 12/06* | (2021.01) |
| *H04W 88/16* | (2009.01) |

(52) U.S. Cl.
CPC ............. *H04L 63/18* (2013.01); *H04L 12/46* (2013.01); *H04L 63/029* (2013.01); *H04L 63/0861* (2013.01); *H04W 12/06* (2013.01); *H04W 76/10* (2018.02); *H04W 88/16* (2013.01)

(58) Field of Classification Search
None
See application file for complete search history.

(56) References Cited

U.S. PATENT DOCUMENTS

| | | | |
|---|---|---|---|
| 7,877,090 B2 | 1/2011 | Maes | |
| 8,621,067 B2* | 12/2013 | Fan | H04L 41/04 709/227 |
| 8,775,188 B2* | 7/2014 | Deng | G06Q 10/10 709/200 |

(Continued)

FOREIGN PATENT DOCUMENTS

| | | |
|---|---|---|
| CN | 105246074 A | 1/2016 |
| EP | 2747370 A1 | 6/2014 |

OTHER PUBLICATIONS

International Search Report and Written Opinion for PCT/US2016/069140 dated Sep. 20, 2017.

*Primary Examiner* — Maung T Lwin
(74) *Attorney, Agent, or Firm* — Buchalter; Jason W. Croft

(57) ABSTRACT

A method for establishing network connections includes connecting a device to a first network, retrieving voice input of a user, sending a message including data related to the voice input to at least one gateway device on the first network, receiving configuration data for a second network via the first network in response to the message, and establishing a connection of the device to the second network using the configuration data received via the first network. Furthermore, an electronic device, a network gateway device and a system are defined.

20 Claims, 5 Drawing Sheets

(56) References Cited

U.S. PATENT DOCUMENTS

| | | |
|---|---|---|
| 8,955,073 B1 | 2/2015 | Scott |
| 2003/0217137 A1 | 11/2003 | Roese et al. |
| 2004/0003051 A1 | 1/2004 | Krzyzanowski et al. |
| 2006/0020694 A1* | 1/2006 | Nag .................... H04L 65/1069 715/700 |
| 2008/0001735 A1 | 1/2008 | Tran |
| 2008/0222711 A1* | 9/2008 | Michaelis ........... H04L 63/0492 726/7 |
| 2010/0248742 A1* | 9/2010 | Song .................... H04L 12/185 455/456.1 |
| 2010/0261494 A1* | 10/2010 | Tiwari ................ H04L 65/4061 455/518 |
| 2016/0048667 A1 | 2/2016 | Kao |
| 2016/0157134 A1 | 6/2016 | Kordianowski et al. |
| 2016/0165451 A1 | 6/2016 | Legris |
| 2017/0034672 A1* | 2/2017 | Pai ........................ H04W 8/02 |
| 2017/0127467 A1 | 5/2017 | Fan |
| 2017/0132749 A1* | 5/2017 | Lim .......................... G06T 1/20 |
| 2017/0134799 A1* | 5/2017 | Park .................... H04N 21/439 |

\* cited by examiner

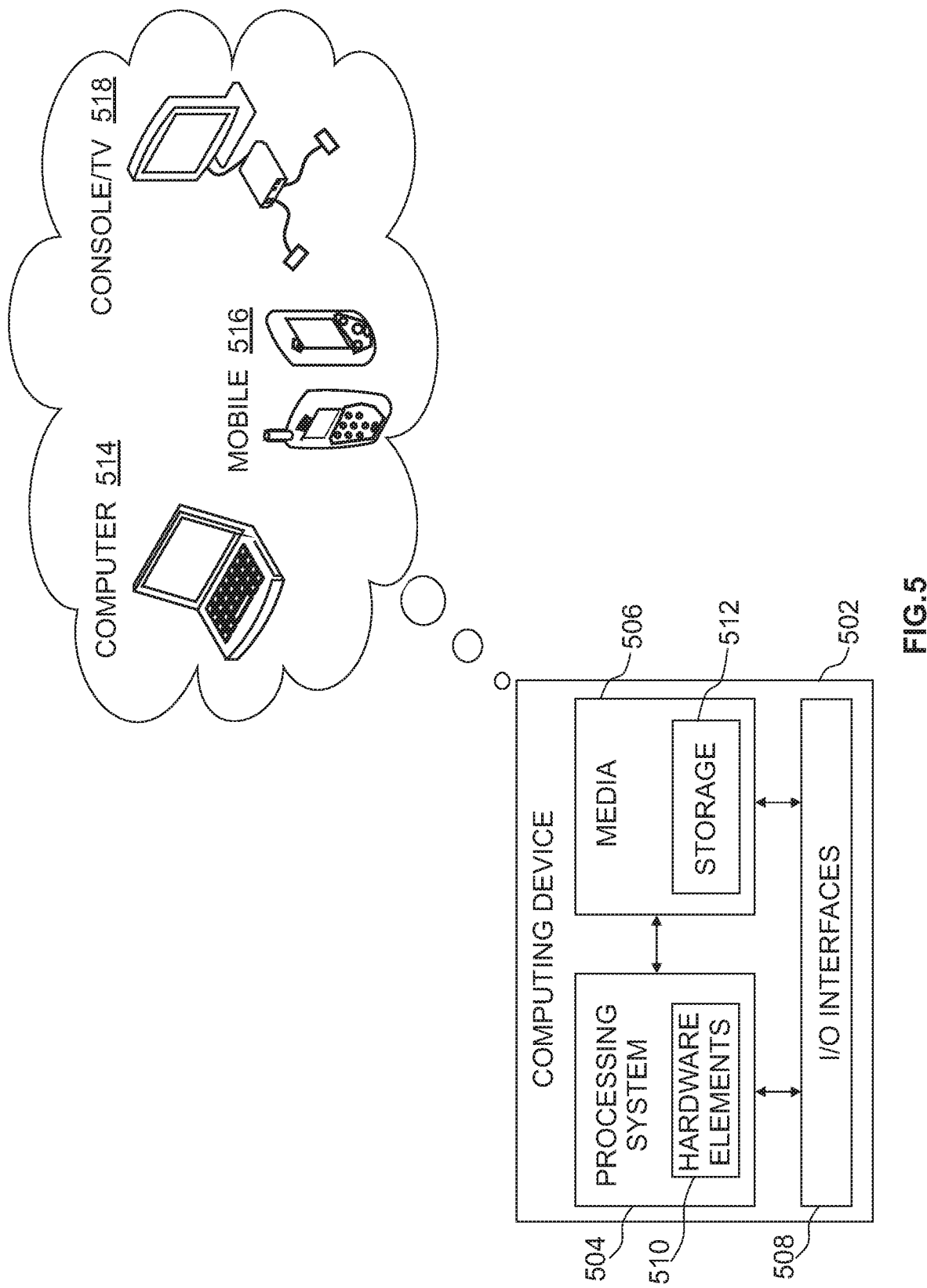

ESTABLISHMENT OF NETWORK CONNECTIONS

REFERENCE TO RELATED APPLICATIONS

This application is a continuation of U.S. patent application Ser. No. 16/464,444 filed Dec. 29, 2016 entitled "ESTABLISHMENT OF NETWORK CONNECTIONS" which is a National Phase entry application of International Patent Application No. PCT/US2016/069140 filed Dec. 29, 2016 entitled "ESTABLISHMENT OF NETWORK CONNECTIONS" in the name of Prashant Dewan et al. and is hereby incorporated by reference in their entireties.

FIELD

Embodiments described herein generally relate to seamless establishment of network connections. In particular, the present disclosure may relate to establishment of network connections based on voice input.

BACKGROUND

Electronic devices are typically connected to networks to communicate with other electronic devices or to access services provided via the network. In order to establish full connectivity with a wired or wireless network, a device has to connect to the network and authenticate itself with the network, for example, by submitting device or user credentials or other configuration data to an entity on the network, such as a router or access point, to establish the connection with the network. However, the credentials or the data has to be pre-stored on the device or a user of the device has to interactively provide the credentials or data, such as a user password.

BRIEF DESCRIPTION OF THE DRAWINGS

FIG. 5 shows a computing device for implementing one embodiment of the present disclosure.

DESCRIPTION OF EMBODIMENTS

Figure 1:
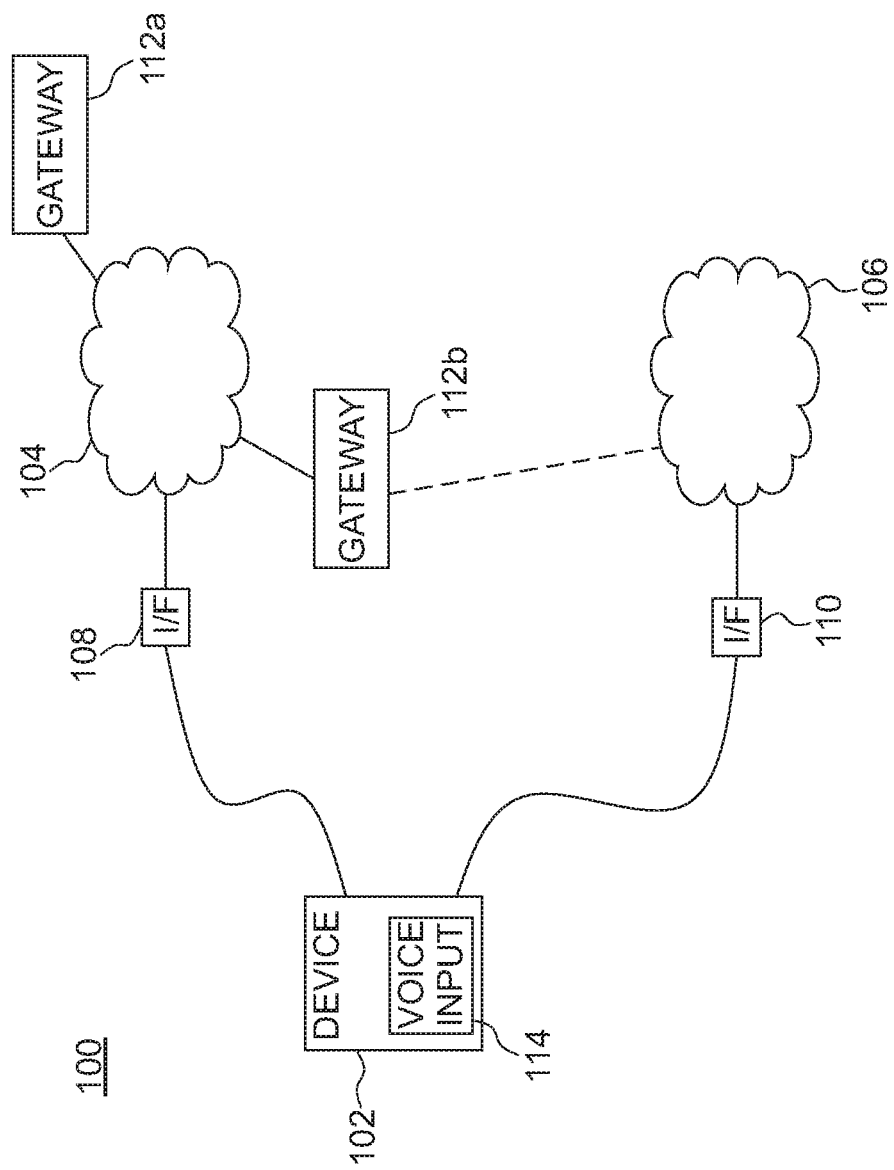
FIG. 1 shows a schematic illustration of a system including devices according to embodiments of the present disclosure.

Embodiments of the present disclosure enable seamless establishment of network connections based on voice input. In order to establish a connection of a device to a network, typically configuration data, such as user or device credentials, have to be transmitted to an entity on the network. This may require either a pre-configuration of the device with the configuration data for each target network, or the configuration data have to be entered by a user at each connection attempt, both of which may be time consuming and disrupting. In particular, if user input is required, the user has to generate a secret, such as a password or a certificate, which could require complex and oftentimes erroneous interaction with the device.

Embodiments of the present disclosure solve these problems by retrieving configuration data for a target network by connecting a device to a first network, retrieving a voice input of a user of the device and submitting a message including data related to the voice input to at least one gateway device on the first network. The configuration data for the target network is received in response to the message via the first network. Using the configuration data received via the first network, a connection of the device to the target network (second network) is established.

The configuration data for the target network may be provided on demand via the first network by connecting the device to the first network and providing a voice-based message to an entity (gateway device) on the network, without requiring any previous configuration of the device with access data to the target network. Furthermore, a user of the device does not need to generate the access data for the target network, such as user credentials, to establish a connection with the target network. Rather, the user may orally interact with the device, such as by speaking a command or pronouncing a text, to generate voice input for an entity on the first network that, in turn, provides configuration data to access the target network. Hence, any data required to connect to the target network is automatically provided via the first network.

According to one embodiment, at least one challenge is received from the at least one gateway device via the first network and the message is provided to the at least one gateway device in response to the at least one challenge. The gateway device may generate the challenge in response to a detection of a connection attempt of the device with the first network. At least a part of the at least one challenge may be presented on the device, such as by displaying the challenge, acoustically reproducing the challenge or via haptic rendering, and the voice input of the user may be sampled or recorded by the device, for example by using a microphone or any other sampling or recording hardware of the device. One or more voice features may be extracted from the voice input and at least some of them may be included into the message. For example, a challenge may include a text string and the user may pronounce the text, which may be recorded by the device and the recorded sample and/or extracted voice features may be sent to the gateway device in order to automatically receive the configuration data for the target network. The voice-based interaction simplifies retrieval of configuration data for the target network. Since the voice input may be based on the challenge, the interaction does not require a complex and potentially erroneous reproduction of exact access data for the target network, such as spelling of a password or other user credentials that have to exactly match. Rather, the message data can be processed as a confirmation of the challenge enabling the gateway device to provide respective configuration data for the target network to the device.

In one embodiment, in response to connecting the device to the first network, the device may receive a plurality of challenges from a plurality of gateway devices on the first network. Each gateway device may be associated with at least one (different) target network. Each challenge may include an identification of the originating gateway device. The device may respond by sending the message only to the gateway device that submitted the respective challenge, and/or the message may be broadcasted to all gateway devices. Based on the content of the message, each gateway device may determine whether the message is intended for the gateway device. The receiving gateway device may provide the configuration data for the associated target network. Furthermore or as an alternative, based on the plurality of challenges, the device may either automatically select an appropriate gateway device or may provide the user with the identifications of the plurality of gateway devices, wherein the user may select one of the gateway devices using voice input. Accordingly, the (plurality of) challenge(s) may be used to automatically or interactively identify a suitable gateway device, which may provide the configuration data for the associated second (target) network.

In yet another embodiment, the voice input may be used to authenticate the user at the gateway device. The configuration data may be provided responsive to a successful voice-based authentication of the user. If the authentication fails at one gateway device, the gateway device may not send the configuration data for the associated second network. Instead, another gateway device that received the message may perform the voice-based authentication of the user and provide the configuration data for another associated network responsive to a successful authentication of the user. If the user cannot be authenticated at any gateway device, the connection establishment may be terminated. The voice-based authentication may be text dependent or text independent. For example, the challenge may include a text, which may be read by the user. Furthermore or as an alternative, the challenge may prompt the user to provide an arbitrary voice input. The voice input may be processed to extract voice features characterizing the voice of the user that may be further scored by the gateway device in order to authenticate the user.

In one embodiment, the device may be connected to the first network via a first interface and to the second network via a second interface. The second network may be a wireless network, such as a mobile network or a WiFi network. The first network may be a wired network. In one embodiment, the first network may be a power line communication (PLC) network. The first interface may be a PLC adapter. The device may comprise a power unit that may include or embed the PLC adapter. The device may be plugged into an electrical socket to connect the PLC adapter of the device with the PLC network. This link may provide the device with both, electric power and a connection to the PLC network. By connecting the device to the PLC network, at least one gateway device on the PLC network may provide the device with configuration data to access the wireless network. The PLC network can be conveniently set-up at a location by providing a gateway device with PLC functionality and easily accessed by plugging devices into existing electrical sockets at that location. Any connection of a device to the PLC network can be interpreted by the gateway device as a confirmation that the device is at a location served by the PLC network that may be accessible to authorized users only, such as at a home location, in an office building or in any area connected via local power lines. Hence, access to the local wireless network may be restricted to local devices that do not require any pre-defined configuration or providing of user credentials for the local wireless network.

In one embodiment, wherein the first network is a trusted network, such as a PLC network at a local site, the configuration data for the second (possibly untrusted) network, such as a wireless network, may be directly provided via the PLC network in response to detecting a connection of a device to the trusted first network. The gateway device on the PLC network may be configured to identify the device and directly transfer the configuration data.

According to one embodiment, the device may include a processing unit implementing a processing stack. The processing stack may include a network component to control network communication with the first and second networks, and a voice extraction engine to process the voice input.

The device according to one or more embodiments of the present disclosure may be any kind of electronic device capable of connecting to at least two networks, wherein a connection of the device to the first network results in retrieval of configuration data to connect to the second network. The device may be a voice-enabled device, such as a personal computer, a portable device, a mobile device or any kind of user equipment with respective communication interfaces and voice processing capabilities.

In one embodiment, the electronic device may include a system on a chip (SoC). Furthermore, the electronic device may be a SoC, which may integrate all or at least some functionality according to one or more embodiments on a single chip and provide communication interfaces to connect the SoC to the first and second networks and an IO interface for voice input. In one embodiment, an apparatus may include the device, such as the SoC, according to one or more embodiments of the present disclosure.

According to another embodiment, a method for establishing network connections is provided. A connection attempt of a device via a first network is detected, a message including data related to voice input of a user of the device is received from the device, and responsive to the message configuration data for a second network is provided to the device via the first network, wherein the configuration data enables the device to establish a connection to the second network. Furthermore, a challenge may be provided to the device via the first network and the message may be received from the device in response to the challenge, enabling a verification of the message. The configuration data for the second network may be provided responsive to a successful verification only. Additionally or as an alternative, the message may include voice features extracted from the voice input of the user and the verification may be a voice-based authentication of the user. In one embodiment, voice authentication data for one or more users may be previously received and the voice authentication data may be used to verify said message.

In one embodiment, the method may be implemented on one or more gateway devices on the first network that may each be associated with a respective second network, for which configuration data may be provided to the connecting device via the first network. The gateway device may listen for connection attempts of any device connecting to the first network and respective messages, in order to serve the device configuration data for the associated second network. The gateway device may be a networked gateway device and may include a plurality of communication interfaces to connect the device with a plurality of networks as well as a processor configured to access instructions stored in a memory that configure the processor to detect connection attempts of one or more devices via a first network of the plurality of networks, receive, from a device of the one or more devices, a message including data related to voice input of a user of the device, and provide, to the device, configuration data for a second network via the first network, which configuration data enable the device to establish a connection to the second network. The gateway device according to one or more embodiments of the present disclosure may be instantiated within the first network in order to serve, responsive to voice-based input, configuration data that automatically enable a connection of network devices to another network associated with the gateway device. This enables seamless connections to target networks by connecting the device to a base (first) network without requiring any further configuration of devices with regard to the target (second) networks or without requiring a user to generate secret data, such as passwords, for the target networks.

The electronic device according to one embodiment and/or the gateway device according to one embodiment may be combined in a system including a first network and at least one second network.

FIG. 1 illustrates a schematic representation of a system including devices according to one or more embodiments of the present disclosure.

The system 100 may include a device 102, which may include a plurality of interfaces to connect to a plurality of networks, such as a first network 104 and a second network 106. Each network 104, 106 may provide connection interfaces 108, 110 that may provide access to the respective network 104, 106. The interfaces 108, 110 may be any kind of network interface, such as wired or wireless network interfaces.

The network 104 may be a local area network with at least one wired interface 108 enabling the device 102 to connect to the network 104 by using a corresponding connector matching the interface 108. In one embodiment, the network 104 may be a power-line communication (PLC) network and interface 108 may be a PLC adapter or an electrical socket. The device 102 may include a network interface that may be connected to the interface 108 to provide a connection to the network 104. For example, the device 102 may include a power unit with a PLC adapter and the device may be plugged into the electrical socket to energize the device 102 and to connect the device 102 with the network 104. Even though network 104 may be described as a PLC-enabled network, it is to be understood that similar or other network technology may be used for the first network, such as any wired Ethernet-based networking technology, digital subscriber line (DSL) technology and the like.

The network 104 may include one or more gateways 112a, 112b that may be configured to listen to connection attempts by one or more devices. Each gateway 112a, 112b may be associated with another network. For example, gateway 112b may be associated with the second network 106. Each gateway 112a, 112b may be configured to provide the devices with configuration data for the respective associated network. For example, the gateway 112b may provide the device 102 with configuration data for the second network 106 to enable the device 102 to connect to the second network 106. The gateways 112a, 112b on the first network 104 may be configured to exchange information with at least one management component (not shown) of the associated networks in order to retrieve the configuration data. For example, the management component may generate a plurality of one-time access tokens and submit the access tokens to a respective gateway 112a, 112b. Additionally or as an alternative, at least some gateways 112a, 112b may directly provide and/or configure the associated network and/or may submit the configuration data to the associated network in order to enable a connection of the device 102 with the associated network based on the configuration data.

The network 106 may be a wireless network, such as a WiFi network or a mobile network, and the interface 110 may be a wireless access point. The configuration data may correspond to device or user credentials or any other access data required for establishing a connection with the network 106 via the wireless access point. It is to be understood that even though the second network 106 is described as a WiFi network, the second network can be based on any wired or wireless networking technology.

It is to be understood that even though the first network 104 is shown with a single interface 108 and the second network 106 is shown with a single interface 110, each network 104, 106 may include one or more interfaces in any combination in order to enable access to the first and second networks 104, 106, respectively, and the present disclosure is not limited by a particular number of interfaces.

As shown in FIG. 1, the device 102 can be plugged into an electrical socket, such as interface 108, in order to automatically retrieve WiFi credentials from one of the gateways 112a, 112b on the PLC network 104. Using the WiFi credentials, the device 102 may connect to the WiFi network by connecting to a WiFi access point, such as the interface 110, and exchanging the WiFi credentials with the access point to establish a connection with the WiFi network 106. Hence, the device 102 may automatically connect to the WiFi network without requiring the user to enter or input anything with regard to the WiFi network or without requiring a pre-configuration of the device 102 for connecting with the WiFi network.

The device 102 may be a voice-enabled device including at least one input/output (10) component providing audio input (and/or output), such as voice data. The component may be any type of sound recording device, such as a microphone 114 of any suitable type, such as an electromagnetic, piezoelectric, fiber optic-based or laser-based microphone, and the like. During connection establishment with the first network 104, the user may be asked to repeat a phrase or command, which can be used to initiate provision of the configuration data by sending or broadcasting a respective message related to the voice input to the gateways 112a, 112b.

The phrase or command (or respective voice features in the message) may be used to verify or authenticate the user and/or to identify a particular gateway 112a, 112b to provide the configuration data for a desired associated network. Additionally or as an alternative, at least one of the gateways 112a, 112b may provide a challenge including a non-secret phrase to the device 102, which may be presented to the user. The user may provide a voice input reflecting the non-secret phrase via the microphone 114. The voice input may be submitted to at least one of the gateways 112a, 112b via the first network 104. A receiving gateway 112a, 112b may determine, whether the voice input corresponds to the non-secret phrase provided by the gateway and provide the configuration data if they match. The gateway 112a, 112b may also or as an alternative authenticate the user based on the voice input and provide the configuration data for authenticated users only.

The first network 104 may span across a plurality of locations. The gateways 112a, 112b may be configured to identify, based on the message or any further data received from the device 102, a location of the device 102. A gateway 112a, 112b associated with a target network serving the identified location may provide the respective configuration data for the associated network. The plurality of locations may be in a building, such as offices, flats or apartments, or in an area or space that may share the same first network 104, while each location may operate a dedicated target network.

The use of voice input to initiate transmission of configuration data, to verify or authenticate a user, or to associate a user with a target network, such as the second network 106, via a first network 104, enables a seamless establishment of connections with the target network without requiring any manual input or complex operation of the device 102. Rather, the user may speak a command, or repeat a certain phrase or an arbitrary text to verify or authorize himself or to associate the device 102 with the target network in an integrated, seamless and secure way.

Figure 2:
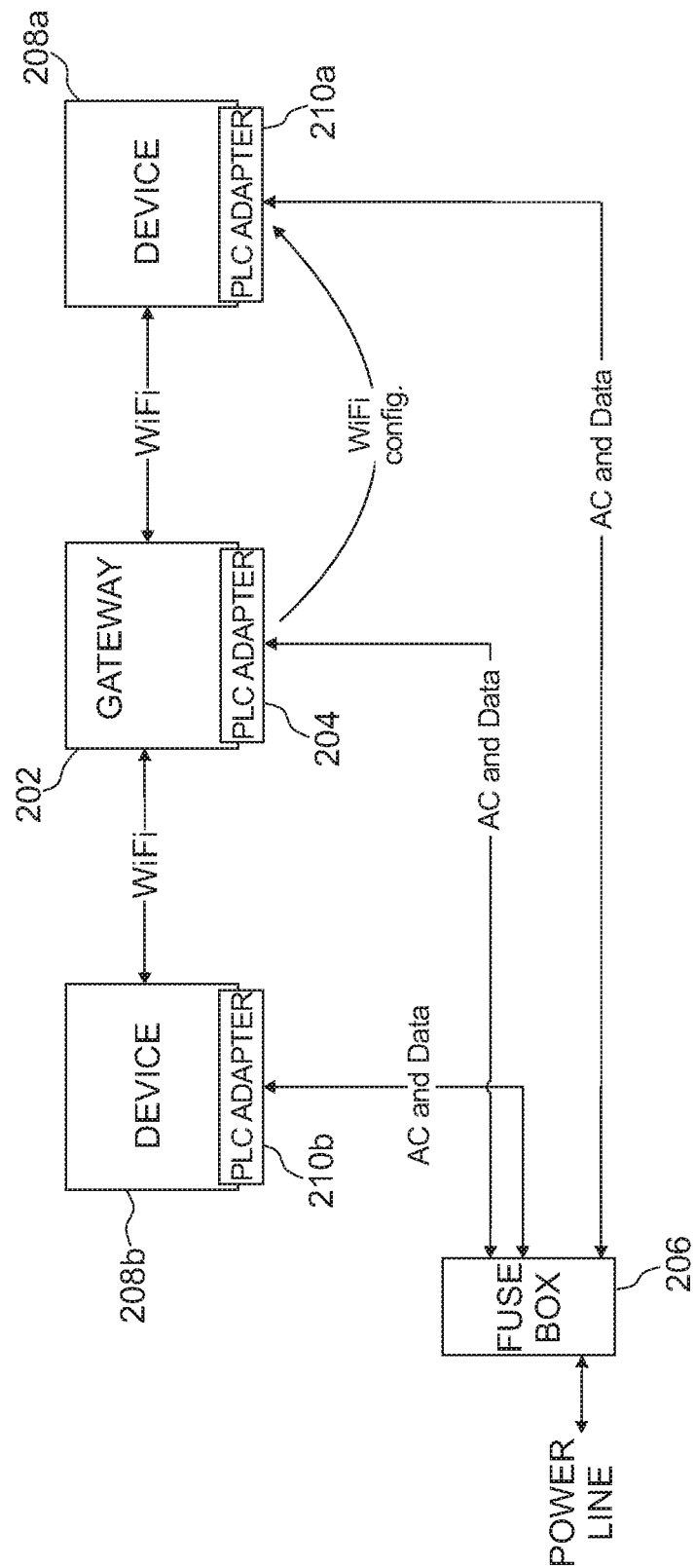
FIG. 2 depicts a schematic illustration of a system of one embodiment of the present disclosure.

FIG. 2 shows yet another schematic illustration of a gateway and devices according to embodiments of the present disclosure. The devices 208a, 208b may correspond to the device 102 as shown in FIG. 1. Furthermore, the gateway 202 may correspond to one of the gateways 112a, 112b as shown in FIG. 1.

The gateway 202 may be a networked electronic device that may include a PLC adapter 204 enabling the gateway 202 to connect to a PLC network. The PLC adapter 204 may be integrated in a power source of the gateway 202. By connecting the gateway 202 with an electrical socket, the gateway 202 is energized and linked to the PLC network. Furthermore, by connecting the PLC adapter 204 to the electric socket, the PLC network can be instantiated on the local electric supply network and any PLC-enabled device connecting to the local electric supply network or to PCL adapters provided at electrical sockets throughout the electric supply network may communicate with the gateway 202. The gateway 202 may further provide access to a wireless network, for example by providing at least one wireless access point.

PLC is a known communication and networking technology that simultaneously carries data and distributes electric power. PLC uses existing electrical wiring or cables of a local electric supply network in a building or in a utility grid as network cables. The existing electrical wiring may be connected in a fuse box 206 that may be further linked with an external power line. In a PLC network, a power line is transformed into a data line via superposition of a low energy information signal to the power wave. For example, a home electrical network operating at 110V or 220V may support PCL networking, operating at frequencies of 1.8-250 MHz. However, it is to be understood that the present disclosure is not limited to a particular setup and configuration of a PLC network. An example specification of PLC is provided in the IEEE 1901 standard. Accordingly, any device linked to the electrical wiring via a PLC adapter (internal or external do the device) may exchange data with other devices on the PLC network via the electrical wiring.

FIG. 2 illustrates two devices 208a, 208b including internal PLC adapters 210a, 210b, which may enable the devices 208a, 208b to connect with an electrical socket to provide the device 208a, 208b with electric power and to connect the device 208, 208b to the PLC network. A connection attempt may be detected by the gateway 202. The device 208a, 208b may broadcast a message on the PLC network, wherein the message may include data related to a voice input of a user of the device 208a, 208b. The gateway 202 may pick up the message and may send configuration data for the wireless network, such as one or more of WiFi access point configuration data, WiFi credentials, user credentials, device configuration data and the like, to the device 208a, 208b through the PLC network. Once a device 208a, 208b obtains the configuration data, the device 208a, 208b may connect to the wireless network using the at least one access point of the gateway 202. However, it is to be understood that the wireless network may include a plurality of access points that may be separate from the gateway 202 and that may be configured such that connections to the wireless network may be established using the configuration data.

Typically, PLC networks operate on a short distance beyond transformer boundaries and, thereby, enable a determination, whether the devices 208a, 208b are within a location. This locality of the devices 208a, 208b may be used as an assumption of an authorization to connect to the local wireless network.

As an additional or alternative security feature, the gateway 202 may require an authentication or verification of a user of the device 208a, 208b by sending to the devices 208a, 208b a challenge that may be presented at least partially to the users via an output interface of the devices 208a, 208b. The at least one challenge may, for example, include a non-secret text. The user may be prompted to speak or utter the text. The voice input may be sampled or recorded and a message may be generated, which may include data related to the voice input. The message may include one or more (processed or unprocessed) voice samples of the voice input. Additionally or as an alternative, the message may include voice characteristics or voice features extracted from the voice input. The message may be transmitted to the gateway 202 via the PLC network. The gateway 202 may use the data of the message to verify or authenticate the user. Responsive to a successful verification or authentication, the gateway 202 may provide the configuration data to the device 208a, 208b operated by the verified or authenticated user.

In one embodiment, the area operated by the PLC network may span multiple locations, which may each define a different target network, such as a different wireless network. For example, a large building or area may be subdivided into compartments, such as multiple offices or apartments at the like, that may be all connected to the same transformer terminals, however, that may all provide different wireless networks. The PLC network may be established in the whole building or area, leading to a potential leakage of information throughout the multiple compartments. In order to determine a desired target network, the gateway 202 may process data of the received message including the voice samples or voice features of the user and may compare the results with pre-enrolled voice features in order to identify the user and a respective target network for the user. The gateway 202 may then provide correct configuration data for the device 208a, 208b to connect to the identified target network. Additionally or as an alternative, each target network may be operated by a different gateway and a gateway may only provide configuration data for the associated target network for users authorized to use the associated target network. If a user cannot be identified, the gateway may refrain from sending the configuration data.

Embodiments of the present disclosure enable a user-friendly connection of devices to networks that neither requires knowledge and generation of secrets for target networks by users, nor a complicated operation, configuration and/or pre-configuration of the devices 208a, 208b for particular target networks.

Figure 3:
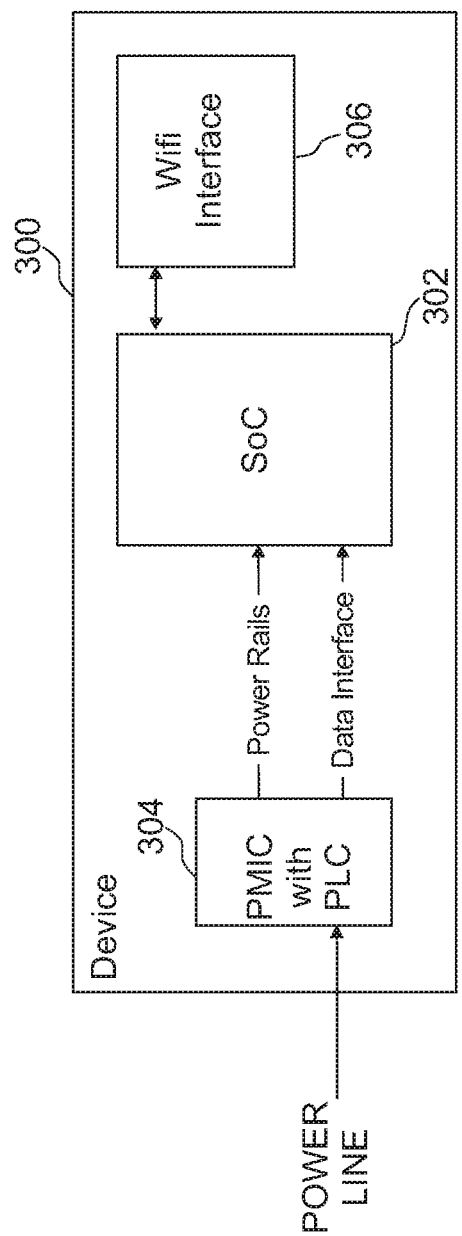
FIG. 3 illustrates a device according to one embodiment of the present disclosure.

FIG. 3 shows a device according to one embodiment of the present disclosure. The device 300 may be the device 102 of FIG. 1 or one of the devices 208a, 208b as shown in FIG. 2.

The device 300 may include a processing system, which may be an integrated system on a chip (SoC) 302. A SoC is widely known in the art as an integrated circuit that integrates components (and other functionality) of a computer or other electronic devices into a single chip. A SoC may include digital, analog, mixed-signal and/or radio-frequency functions in any combination. SoCs may be used in the area of embedded systems. Typically, SoCs may be used as a basis of mobile or portable devices, such as mobile communication devices, media players, user equipment, terminal devices, and the like. However, it is to be understood that a SoC is not restricted to a particular area or functionality and rather may provide a broad range of integrated functionality suitable for any kind of general computing functionality in a small scale form factor. Either as a separate component or within the SoC 302, the device 300 may include a power management unit or a power management IC 304. Either as a separate component or within the SoC 302, the device 300 may further include a wireless interface 306 enabling the device 300 to connect to a wireless network.

The power management IC 304 may provide an interface to a power line in order to provide power rails to the device and/or to the SoC 302 to energize the device and/or the SoC 302. The power management IC 304 may further include an inbuilt PLC adapter for PLC networking. By connecting the device 300 to a power line, for example, via an electrical socket, the power management IC 304 may provide an interface to data provided via the PLC network to the SoC 302.

As soon as the device 300 is connected to the PLC network via power management IC 304, the SoC 302 may be configured to broadcast a message to the PLC network via the data interface of the power management IC 304. In response, a gateway device on the PLC network may provide the device 300 with configuration data via the PLC network that may be processed by the SoC 302 in order to configure the wireless interface 306 to connect to an associated wireless network. In one embodiment, the device 300 may further include voice recording functionality to receive voice input that may be processed by SoC 302 and included into the message.

The functionality according to one or more embodiments of the present disclosure may be implemented in a software stack that may be executed on the SoC 302. The software stack may communicate with a similar stack on the gateway device. The software stack may have one or more components including a PLC stack that may be responsible for setting up a connection with the gateway via the PLC network.

In one embodiment, the software stack may include a voice extraction engine that may be responsible for processing voice signals and extracting voice data. For example, the device 300 may include at least one output component, such as a display or a speaker and at least one input component, such as a microphone (not shown). The output component may be used to interact with the user of the device 300 and the input component may be used to receive an input, such as a voice input. The voice input may be processed by the voice extraction engine of the software stack implemented in the SoC 302. The voice input may include a voice sample or any voice signals that may be processed into voice features that may be used for voice recognition or for speaker verification or authentication using known approaches, such as template matching approaches, approaches based on probabilistic models or approaches based on artificial neural networks, and the like. For example, the voice extraction engine may be configured to extract voice features based on a trained probabilistic model, including an extraction of i-vectors based on a Gaussian mixture model (GMM). However, it is to be understood that the present disclosure is not limited to a particular implementation of the voice extraction engine and rather additional and/or different functionality may be provided in the voice extraction engine to enable an extraction of voice features based on voice input of a user of the device 300.

The extracted voice features, such as i-vectors, may be sent to the gateway using the PLC stack via the PLC network and the gateway may analyze the voice features in order to authenticate or verify the user or assign the device 300 to an associated target network. Accordingly, the gateway may provide the device 300 with appropriate configuration data for the associated target network.

Figure 4:
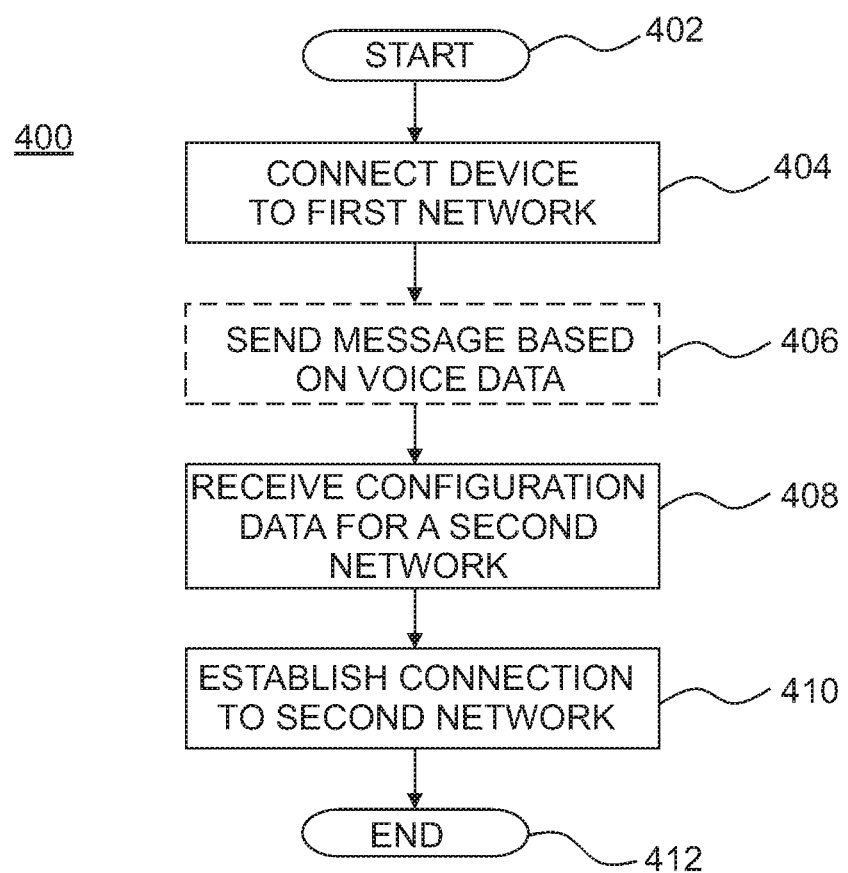
FIG. 4 shows a flow chart of a method according to one embodiment of the present disclosure.

FIG. 4 shows a flow chart of a method according to one embodiment of the present disclosure. The method 400 may be executed on one or more devices according to the present disclosure, such as on device 102 of FIG. 1, on devices 208a, 208b of FIG. 2, or on device 300 of FIG. 3.

The method may start in item 402 and may continue in item 404, wherein the device may connect to a first network. A gateway on the first network may listen to connection attempts of devices and responsive to a connection attempt, the gateway may initiate a communication with the device.

In item 406, the device may send a message to the gateway, which may include data related to voice input. The voice input may be recorded on the device. Respective voice samples may be either directly included into the message or further processed to extract voice features. At least some of the voice features may be included into the message. Additionally, prior to generating the message and retrieving the voice input, the gateway may send at least one challenge to the device, which may be, at least partially, presented to the user and a response of the user may be recorded as voice input by the device.

As indicated by the dashed line, item 406 may be optional. In one embodiment, wherein a trusted first network is used, such as a PLC network, the gateway may identify the device responsive to a connection of the device to the PLC network in item 404. For example, the gateway device may receive a message broadcasted by the device upon connection to the PLC network in item 404.

In response to the message sent in item 406 or in response to an identification of the device, the gateway may send configuration data for a second network to the device via the first network, which may be received by the device in item 408. The gateway may identify the user or an associated target network, for example, by analyzing the message, and/or authenticating or verifying the user based on the voice input. The gateway may send the configuration data for the identified target network and/or only if the user is successfully authenticated or verified.

In item 410, the device may use the configuration data received via the first network to establish a connection to the second network. Optionally, the connection to the first network can be interrupted and/or terminated. After establishing the connection to the second network in item 410, the method 400 may end in item 412.

According to another embodiment, a method corresponding to method 400 may be executed on a gateway device within the first network. The method may be executed on gateways 112a, 112b of FIG. 1 or on gateway 202 of FIG. 2. The method may include detecting connection attempts of one or more devices via a first network, for example, responsive to execution of item 404 of method 400. The gateway device may provide to a connecting device a challenge via the first network and may wait for a message including data related to voice input of a user of the device. The message may be generated, for example, in item 406 of method 400. The message may be analyzed in order to identify an associated target network. Thereafter, configuration data for the associated target network may be provided to the device via the first network that may be received in item 406 of method 400. Said configuration data may enable the device to establish a connection to the associated target network, for example, in item 410 of method 400.

In one embodiment, the devices and the gateway may be configured in two parts. In a first part, the gateway may be configured by providing the gateway with respective configuration data for target networks. If no voice authentication is required, the gateway does not require any further configuration data except for setting up the gateway as a traditional router on the first network to enable processing according to embodiments of the present disclosure.

For voice-based authentication, the gateway may be provided with data, such as templates, voice samples and/or voice features of individual users, to perform voice and/or speaker recognition. For example, the gateway may receive voice samples and may generate or extract voice features out of it to generate the templates, and may apply a GMM and i-vector based algorithm to set up a voice-based authentication. The voice samples may be collected using an inbuilt microphone or a port where a microphone may be connected. Additionally or as an alternative, the voice samples may be provided and collected via a first voice-enabled device that may be connected to the PLC network.

In the second part, the devices, such as the device 102 of FIG. 1, devices 208a, 208b of FIG. 2, and device 300 of FIG. 3 may be configured by plugging the devices into an electrical socket to energize the device and simultaneously provide a connection to the PLC network. If the gateway device on the PLC network is configured to ask for voice-based authentication or speaker recognition, the gateway device may send a challenge including, for example, a text string to the device. The device may present the text string to the user, for example by speaking the text string to the user or displaying the text string on the device. The user may be required to speak the text back to the device, which may send a corresponding voice sample or extracted voice features, such as i-vectors, from the user's voice to the gateway device. The gateway device may verify the spoken input and may send the configuration data for the target network back to the device responsive to a successful verification.

According to another example embodiment, multiple gateway devices may be connected via the same PLC network. In this case, each gateway device may be able to authenticate users via voice and in response thereto provide corresponding configuration data for connecting to an associated target network. Accordingly, the user may be expected to enroll his voice to his gateway device only. Even though the plurality of gateway devices on the PLC network may receive the message including the voice sample or voice features, only the gateway device having a template of the user's voice may recognize or authenticate the user and may therefore send the appropriate configuration data.

In one embodiment, the PLC network may connect gateway devices that may have a heterogeneous configuration according to one or more embodiments of the present disclosure. For example, at least one gateway device may require a voice-based authentication, while at least one other gateway device may not require voice-based authentication. In this situation, the device may receive two configuration data: a first configuration data sent by a first gateway device, which may not require voice authentication, and a second configuration data that may be sent by a second device that has successfully authenticated the user of the device. The device may be configured to react on a plurality of configuration data for different target networks either by enabling the user to select a suitable network, by selecting configuration data based on voice authentication in order to enable a more secure (verified) connection, or may select configuration data that arrived as first at the device. Furthermore, a selection may be based on characteristics of the available target networks, such as a signal strength, network bandwidth, and the like.

In yet another example scenario according to one embodiment, multiple gateway devices may be associated with a single location and provide access to different target networks. In this scenario, the user may be presented with a selection of the plurality of configuration data indicating the plurality of target networks and may utter or otherwise indicate his choice of a particular target network.

Embodiments of the present disclosure may be implemented in a variety of devices, including computing devices, mobile devices, set-up boxes, television devices, home assistance devices and any other electronic devices providing network connectivity for first and second networks, respectively. Furthermore, embodiments of the present disclosure may be implemented on voice-enabled electronic devices. FIG. 5 shows a corresponding example computing device 502 that is representative of one or more computing systems and/or devices that may implement the various techniques described herein. The computing device 502 may be, for example, a device operated by and associated with a user, such as the device 102 of FIG. 1, the devices 208a, 208b of FIG. 2 or device 300 of FIG. 3. The device 502 may also be a gateway device, a router or as a server, such as the gateways 112a, 112b of FIG. 1 or the gateway 202 of FIG. 2. The computing device 502 may further include a system on chip (SoC) providing the functionality and/or integrating the structural components according one or more embodiments of the present disclosure.

The computing device 502 may include a processing system 504, computer-readable media 506 and one or more I/O interfaces 508 that may be communicatively coupled to one another or enable connections of the computing device 502 to a network (not shown). The computing device 502 may further include a system bus or other data and command transfer system (not shown) that may couple various components of the computing device 502 to each other. A system bus may include one or more of different bus structures in any combination, such as a memory bus, a peripheral bus, a local bus, a universal serial bus (USB) and/or a processor bus, which may be based on a variety of bus architectures, in any combination.

The processing system 504 may represent functionality to perform one or more operations using hardware. For example, the processing system 504 may be configured to perform a method according to one or more embodiments of the present disclosure, to seamlessly establish a connection to a target network. The processing system 504 may include hardware elements 510 that may be configured as processors, functional blocks, stacks and the like. This may include an implementation in hardware as a logic device formed using at least one semiconductor or integrated circuit. The hardware elements 510 may include components of an integrated circuit or a system on chip (SoC), an application-specific integrated circuit (ASIC), a feed-programmable gate array (FPGA), a complex programmable logic device (CPLD) and other implementations in silicon or other hardware devices. In this context, a hardware element may operate as a processing device that performs program tasks or functionality as defined by instructions, modules and/or logic embodied by the hardware element as well as a hardware device utilized to store instructions for execution, such as the computer-readable media 506. The hardware elements 510 are not limited by certain layout or structure and may include any material from which they are formed or processing mechanisms that may be employed therein. For example, processors may include semiconductors and/or transistors.

Various actions, such as generating, obtaining, communicating, receiving, sending, maintaining, storing, and so forth performed by various components, modules or entities are discussed herein. A particular module, component or entity discussed herein as performing an action or functionality may include that particular module, component or entity itself performing the action or alternatively that particular module, component or entity invoking or otherwise accessing another component, module or entity that performs the action or performs the action in conjunction with that particular module, component or entity as implemented in the hardware elements 510 of the processing system 504 or within the computing device 502.

The computer-readable media 506 may include at least one storage 512. The storage 512 may represent a memory or storage resource with memory or storage capacity associated with the media 506. The computer-readable media 512 may include instructions that may reflect a method according to one or more embodiments of the present disclosure that, when read and executed by the processing system 504 may configure the computing device 502 to perform the method according to the one or more embodiments of the present disclosure. The computer-readable media 506 may enable persistent and/or non-transitory storage of information in contrast to mere signal transmission, carrier waves or signals. The computer-readable media 506 may include hardware such as volatile and non-volatile, removable and non-removable media and/or storage modules, units or devices implemented in a method or technology suitable for storage of information, such as computer-readable instructions, data structures, program modules, logic elements, logic circuits or other data. Examples of computer-readable media 506 include, but are not limited to, RAM, ROM, EEPROM, flash memory, CD-ROM, DVDs, Blu-Ray discs or other optical storage hard discs, magnetic cassettes, magnetic tape, magnetic disc storage or other magnetic storage devices, or other storage devices, tangible media or article of manufacture suitable to store the desired information and accessible by computing device 502. The storage 512 may include fixed media such as RAM, ROM, one or more hard drives and the like, as well as removable media, such as flash memory sticks, removable hard drives, optical discs and the like. However, it is to be understood that a computer-readable media 506 may be configured in a variety of other ways in order to provide instructions and other data for the processing system 504 to configure the computing device 502 to perform one or more methods according to one or more embodiments of the present disclosure.

The I/O interfaces 508 may define input and/or output devices or interfaces to such input/output devices that may enable a user to enter commands and information to the computing device 502 and/or allow information to be presented to a user of the computing device 502. Furthermore, the interfaces 508 may be suitable to interconnect the computing device 502 with other computing devices and/or other components of other computing devices, for example, via a network in any suitable way. Examples of input devices may include a keyboard, a mouse, a touch-enabled input component, a microphone, a scanner, a camera and the like. Examples of output devices may include a display device, such as a monitor or a projector, speakers, a printer, a network card, a tactile input device and the like. Furthermore, at least one input device and an output device may be combined, for example as a touch display of the computing device 502. Accordingly, the computing device 502 may be configured in a variety of ways to enable interaction of the computing device 502 with other devices or a user operating the computing device 502.

Various techniques may be described herein in the general context of software, hardware elements or program modules. Generally, such modules may include routines, programs, objects, elements, components, data structures and the like that may perform particular tasks or implement particular abstract data types. The term "module", "functionality" and "component" as used herein generally represent software, firmware, hardware or a combination thereof. The features of the techniques described herein are platform-independent, meaning that the techniques may be implemented on a variety of commercial computing platforms having a variety of processors, as provided in processing system 504. An implementation of the described modules and techniques may be stored on or transmitted across some form of computer-readable media, such as the computer-readable media 506 accessible by the computing device 502. Combinations of the foregoing may be employed to implement various techniques, methods and modules described herein. Accordingly, software, hardware or program modules may be implemented as one or more instructions and/or logic embodied on the computer-readable media 506 or by one or more hardware elements 510. The computing device 502 may be configured to implement instructions and/or functions corresponding to the software and/or hardware modules according to one or more embodiments of the present disclosure. Accordingly, implementation of a module that is executable by the computing device 502 as a software may be achieved at least partially in hardware, such as through use of computer-readable media 506 and/or hardware elements 510 of the processing system 504.

The computing device 502 may assume a variety of different configurations, such as for computing applications 514, mobile applications 516 and in consoles or television applications 518. Each of these configurations 514, 516, 518 may include devices that may have generally different constructs and capabilities and thus the computing device 502 may be configured according to one or more of the different application classes. The techniques described herein may be supported by various configurations of the computing device 502 and are not limited to specific examples described herein. For example, the computing device 502 may be implemented for computer applications 514 in a device that may include a personal computer, a desktop computer, a multi-screen computer, a laptop computer, a netbook and the like. The computing device 502 may also be implemented for mobile application 516 in a mobile device, such as a smartphone, a mobile phone, a portable music player, a portable gaming device, a tablet computer, a multi-screen computer, a home assistance device and the like. The computing device 502 may also be implemented as a console or television device that may include interactive devices connected to screens or (interactive) presentation of media. These devices may include televisions, set-top boxes, gaming consoles and the like.

The computing device 502 may be connected to any kind of network via one of the I/O interfaces 508. For example, the I/O interfaces 508 may include an Ethernet interface, a PLC adapter, a wireless interface for WiFi networks or a mobile network, a Bluetooth interface and the like in order to implement networking functionality as defined in one or more embodiments of the present disclosure. The computing device 502 may connect via the network to a server gateway or any other computing device on the network, in order to establish a connection to a target network.

The following examples pertain to further embodiments.

Example 1 is a method for establishing network connections, comprising connecting a device to a first network; retrieving voice input of a user; sending a message including data related to the voice input to at least one gateway device on the first network; receiving configuration data for a second network via the first network in response to the message; and establishing a connection of the device to the second network using the configuration data received via the first network.

In Example 2, the subject matter of Example 1 can optionally further comprise receiving at least one challenge from the at least one gateway device via the first network and providing the message to the at least one gateway device in response to the at least one challenge.

In Example 3, the subject matter of Example 1 or 2 can optionally further comprise presenting at least a part of the at least one challenge to the user.

In Example 4, the subject matter of Example 3 can optionally further comprise extracting one or more voice features from the voice input and including at least some of the one or more voice features into the message.

In Example 5, in the subject matter of Example 4 the configuration data for the second network can be optionally provided responsive to a voice-based authentication of the user based on the at least some voice features.

In Example 6, the subject matter of one of the Examples 1 to 5 can optionally further comprise receiving a plurality of challenges from a plurality of gateway devices and providing the message as a response to one of the plurality of challenges to a corresponding gateway device of the plurality of gateway devices.

In Example 7, in the subject matter of one of the Examples 1 to 6, the second network can optionally be a wireless network.

In Example 8, in the subject matter of one of the Examples 1 to 7, the device can optionally comprise a power-line communication adapter to connect the device is connected to the first network.

Example 9 is a method for establishing network connections, comprising detecting a connection attempt of a device via a first network; receiving, from the device, a message including data related to voice input of a user of the device; and in response to the message, providing, to the device, configuration data for a second network via the first network, said configuration data enabling the device to establish a connection to the second network.

In Example 10, the subject matter of Example 9 can optionally further comprise providing, to the device, a challenge via the first network, receiving, from the device, the message in response to the challenge, verifying the message, and providing the configuration data for the second network responsive to a successful verification.

In Example 11, in the subject matter of Example 10, the message can optionally include voice features extracted from the voice input of the user and the verification is a voice-based authentication of the user.

In Example 12, the subject matter of Example 10 or 11 can optionally further receive voice authentication data for one or more users and use the voice authentication data to verify said message.

Example 13 is one or more tangible media storing instructions thereon that when executed on an electronic device configure the electronic device to perform a method according to one of the preceding Examples.

Example 14 is an electronic device, comprising one or more communication interfaces; an input device; and a processing unit configured to connect the device to a first network via one of the one or more communication interfaces, retrieve voice input of a user via the input device, send a message including data related to the voice input to at least one gateway device on the first network, receive configuration data for a second network via the first network in response to the message, and establish a connection to the second network via another one of the one or more communication interfaces, using the configuration data received via the first network.

In Example 15, the subject matter of Example 14 can optionally further comprise a power unit including at least one of the one or more communication interfaces, to connect the device to a power-line communication network.

In Example 16, in the subject matter of Example 15, the one communication interface can optionally be an embedded PLC adapter.

In Example 17, in the subject matter of one of the Examples 14 to 16, the one or more communication interfaces can optionally include at least one wireless interface to connect the device to a wireless network using the configuration data.

In Example 18, in the subject matter of one of the Examples 14 to 17, the processing unit can optionally be a processing stack including a network component to control network communication with at least one of the first and second networks, and a voice extraction engine to process voice input from the input device.

In Example 19, in the subject matter of one of the Examples 14 to 18 the electronic device can optionally be a system on a chip (SoC).

Example 20 is a networked gateway device comprising at least one communication interface configured to connect the device to at least one network; a memory; and at least one processor configured to access instructions in the memory and, responsive to said instructions, to detect connection attempts of one or more devices via a first network of the at least one network; receive, from a device of the one or more devices, a message including data related to voice input of a user of the device; and provide, to the device, configuration data for a second network via the first network, said configuration data enabling the device to establish a connection to the second network.

In Example 21, in the subject matter of Example 20, the device can optionally be connected to the first network and to the second network via respective communication interfaces.

In Example 22, in the subject matter of Example 20 or 21, at least one of the communication interfaces can optionally be an embedded PLC adapter.

Example 23 is a system comprising a first network; at least one second network; at least one gateway device, each connected to the first network and associated with one of the at least one second network and configured to detect connection attempts of one or more devices via the first network; receive, from a device of the one or more devices, a message including data related to voice input of a user of the device; and in response to the message, provide, to the device, configuration data for the associated second network via the first network, said configuration data enabling the device to establish a connection to the associated second network.

Embodiments of the present disclosure enable a seamless connection of devices to associated target networks by connecting the devices to a local network, via which configuration data for the associated target network are directly provided in response to voice-based input. This enables connections to target networks in a convenient way without acquiring a user to provide any input directed at the target network, such as user credentials, secret data, passwords and the like, or a respective pre-configuration of the device. The connection establishment may be further secured by enabling voice-based authentication.

It is to be understood that functionality as defined in methods according to one or more embodiments of the present disclosure may be integrated as functional components or processing features of devices or systems according to further embodiments of the present disclosure, in any combination. Likewise, structural components of devices and systems according to one or more embodiments of the present disclosure may be defined as processing items of methods according to other embodiments of the present disclosure, in any combination.

While some embodiments have been described in detail it is to be understood that aspects of the disclosure can take many forms. In particular, the claimed subject matter may be practiced or implemented differently from the examples described and the described features and any characteristics may be practiced or implemented in any combination in embodiments of the present disclosure. The embodiments shown herein are intended to illustrate rather than to limit the invention as defined by the claims.

The invention claimed is:

1. A method, comprising:
creating a first network by a first device;
in response to detecting the first network, connecting a second device to the first network;
identifying an instruction to connect the first device to a second network;
receiving configuration data for the second network from the second device via the first network; and
causing a connection of the first device to the second network using the configuration data received from the second device.

2. The method of claim 1, wherein receiving the configuration data for the second network from the second device in response to the instruction includes receiving at least one of: an identifier of the second network, a device credential, a user credential, a password associated with the second network, or a security setting associated with the second network.

3. The method of claim 1, wherein at least one of the instruction or the configuration data are received as a voice input.

4. The method of claim 1, wherein identifying the configuration data for the second network at the second device in response to the instruction includes:
receiving a challenge from a network device associated with the second network;
providing, to the network device, a response to the challenge; and
responsive to a successful response to the challenge, receiving the configuration data from the second device via the first network for the second network.

5. The method of claim 4, wherein the response to the challenge includes a voice input that is received at either the first device or the second device.

6. The method of claim 1, wherein causing the connection of the first device to the second network using the configuration data received via the second device includes:
selecting a target network device that is associated with the second network; and
causing the first device to associate with the target network device via the second network.

7. The method of claim 6, wherein the target network device is selected based on a voice input.

8. The method of claim 1, wherein first network and the second network are both wireless networks.

9. The method of claim 1, wherein the first device includes a mobile device.

10. The method of claim 1, wherein the first device automatically receives the configuration data for the second network responsive to the second device connecting to the first network.

11. A method, comprising:
creating, only by a first device, a first network, wherein a second device is to later associate with the first network created by the first device to assist, in response to detecting the first network by the second device, with a connection of the first device to a second network;
determining that the second device has joined the first network created by the first device;
receiving, at the first device, configuration data for the second network from the second device via the first network to assist with the connection of the first device to the second network; and
establishing the connection of the first device to the second network using the configuration data received from the second device.

12. The method of claim 11, wherein receiving the configuration data for the second network from the second device via the first network includes receiving at least one of: an identifier of the second network, a device credential, a user credential, a password associated with the second network, or a security setting associated with the second network.

13. The method of claim 12, wherein the configuration data are received as a voice input.

14. The method of claim 11, wherein when receiving the configuration data for the second network from the second device via the first network, a challenge is received at the second device from a network device associated with the second network, wherein the first device is to provide, to the network device, a response to the challenge; and
responsive to a successful response to the challenge, receiving the configuration data for the second network from the first device via the first network.

15. The method of claim 14, wherein the response to the challenge includes a voice input that is received at either the first device or the second device.

16. The method of claim 11, wherein establishing the connection of the first device to the second network using the configuration data received from the second device includes:
selecting a target network device that is associated with the second network; and
causing the second device to associate with the target network device via the second network.

17. The method of claim 16, wherein the target network device is selected based on a voice input.

18. The method of claim 11, wherein first network and the second network are both wireless networks.

19. The method of claim 11, wherein the second device includes a mobile device.

20. The method of claim 11, wherein the first device automatically receives the configuration data for the second network responsive to the second device connecting to the first network.

* * * * *